(12) United States Patent
Gilbert (10) Patent No.: US 7,506,310 B2
(45) Date of Patent: Mar. 17, 2009

(54) METHOD AND SYSTEM FOR CACHING MANAGED CODE FOR EFFICIENT EXECUTION ON RESOURCE-CONSTRAINED DEVICES

(75) Inventor: Mark E. Gilbert, Aachen (DE)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 11/063,706

(22) Filed: Feb. 22, 2005

(65) Prior Publication Data
US 2006/0190932 A1 Aug. 24, 2006

(51) Int. Cl.
G06F 9/44 (2006.01)

(52) U.S. Cl. .................. 717/120; 717/121; 717/122; 717/123

(58) Field of Classification Search .......... 717/120–123
See application file for complete search history.

(56) References Cited

U.S. PATENT DOCUMENTS 6,202,208 B1 * 3/2001 Holiday, Jr. ............. 717/166
6,584,612 B1 * 6/2003 Mueller et al. ........... 717/166
2004/0015877 A1 * 1/2004 Arrouye et al. .......... 717/127
2005/0102657 A1 * 5/2005 Lewis ..................... 717/140
2005/0183077 A1 * 8/2005 Langdale et al. ......... 717/148

* cited by examiner

*Primary Examiner*—Wei Y Zhen
*Assistant Examiner*—Junchun Wu
(74) *Attorney, Agent, or Firm*—Workman Nydegger (57) ABSTRACT

Described is a system and method that separates a managed code runtime library or program into four parts, comprising a header, resources, metadata and method implementations. The metadata and some or all of the resources are maintained in system memory (RAM) the entire time that the program is running. The method implementations and any non-maintained resources are loaded on demand, and then discarded such as via garbage collection. The amount of memory consumed by a managed code program is thus reduced relative to non-separated environments, but because the metadata and selected resources are in memory, the program execution is highly efficient due to significantly reduced access of data in non-volatile storage. The parts of the assembly that are maintained in RAM can be saved as code library files, providing shared use by programs and efficient loading by eliminating any need to again parse a program to identify the separate parts.

20 Claims, 4 Drawing Sheets

METHOD AND SYSTEM FOR CACHING MANAGED CODE FOR EFFICIENT EXECUTION ON RESOURCE-CONSTRAINED DEVICES

FIELD OF THE INVENTION

The invention relates generally to computer systems, and more particularly to running managed computer programs on computing devices having resource-constrained platforms.

BACKGROUND

Some contemporary computing devices, such as mobile telephones, have limited resources including memory and processing power, yet also run computer programs. Devices that have more sophisticated platforms are able to run pre-compiled programs as well as run managed code, in which runtime environments interpret or just-in-time compile program code; the term "managed code" is generally used herein to refer to any software code that contains one or more programs that are not in the CPU's native instruction set and/or have memory functionality managed for them by the system. In many cases, the operating system employs virtual memory-based memory-mapped files, wherein the entire file is shown as appearing in memory, but the operating system actually loads memory units in and out of actual RAM based on their usage. Hardware support handles much of the checking as to whether swapping is needed.

Other devices have platforms that do not allow virtual memory and/or memory mapping techniques to be used. Such devices in general are able to run pre-compiled programs, but often cannot efficiently run programs written in managed code, or the functionality of the program is limited relative to pre-compiled programs because of memory consumption. One reason is that without memory mapping, to efficiently run, an entire program file needs to fit into memory, which (unless the size of the program is severely limited) tends to consume so much space that there is not sufficient memory available for the framework that is needed to run the managed code. Another reason is that hardware support for caching may not be present, whereby code is required to be run to perform checks as to whether file data needs to be loaded. This slows performance drastically. Moreover, even if hardware support was provided, accessing the storage (which may be additional memory containing a compressed version of the file to be run) is highly inefficient and slow, due to the caching mechanism needing to repeatedly access the file system and/or decompress file data in order to fill the cache with needed file-based code and data.

What is needed is a way to efficiently run managed code, particularly on platforms that do not support virtual memory and/or memory mapping. The solution should be efficient in the amount of memory consumed, as well as in maintaining high performance and in limiting swapping between memory and storage.

SUMMARY OF THE INVENTION

Briefly, the present invention is directed towards a system and method by which various sections (parts) of a managed code assembly are handled differently with respect to caching in memory. A result is that resource-constrained devices, including those without the ability to use virtual memory/ memory mapping techniques, are able to reduce the memory needed to efficiently execute managed code.

To this end, in one example implementation, a loader mechanism selectively loads/maintains specific sections of a managed code program (assembly/module) in memory while the program is running, including information (e.g., offsets) to non-loaded program parts of the managed code program, which are loaded only on demand. This essentially allows the runtime to execute much of the program without accessing the file system. Because much of the file content of the assembly is kept out of memory, the amount of memory required for a given program is lowered, and there is sufficient space for a runtime environment that runs managed code to be loaded.

In general, the behavior of a runtime/execution engine and the layout of managed code files are used to substantially optimize the memory usage. Each managed code file is parsed into sections based on that section's functionality, content and usage. Certain sections are maintained in memory for the entire time that the program is running, while others are loaded on demand, that is, while needed. In one implementation a loader mechanism parses the managed code assembly in nonvolatile storage into four general sections, comprising a header, resources, metadata and method implementations. Some or all of the resources and the metadata are maintained in the memory (RAM), while the method implementations and any non-maintained resources are loaded on demand. The Header is loaded into the memory, used, and discarded such as via a garbage-collected memory system.

The data of the Resources section may be treated differently with respect to caching, such as by type of resource and/or size. For example, one type of resource comprises the program's strings, which may be kept in memory, while another type of resource comprises large images, which may be loaded on demand and then discarded. Other types of resources may comprise user interface-related control images, such as small icons, dialog, and window and control layout information or the like, which are regularly needed. These types of images may be maintained in the memory.

The metadata section contains information about the classes, members and methods in a program, and is frequently used in running managed code, e.g., for type checking and identifying objects' functions. Because the metadata is frequently accessed, the metadata section is thus kept in the memory the entire time that the program is running.

The method implementations are loaded and just in time compiled on demand, and then the initial byte code implementation can be removed from memory. However, for additional efficiency, the just in time (JIT) compiler may have an associated in-memory JIT cache of compiled methods, e.g., kept until space is needed, such as via a most recently used or most frequently used algorithm.

Once in memory, the selected sections of the assembly that are loaded into memory can be saved as a code library file by serializing the data into a native library file (e.g., DLL) for the platform. This file may then be copied directly to memory and run, with the rest of the managed code program file accessed on demand. In this manner, the RAM requirements for a library may be shared across processes by loading once and pointing each process to the same location in memory. This saves space and can also significantly reduce startup time, because no subsequent parsing by the loader is needed.

DETAILED DESCRIPTION

Exemplary Operating Environment

Figure 1:
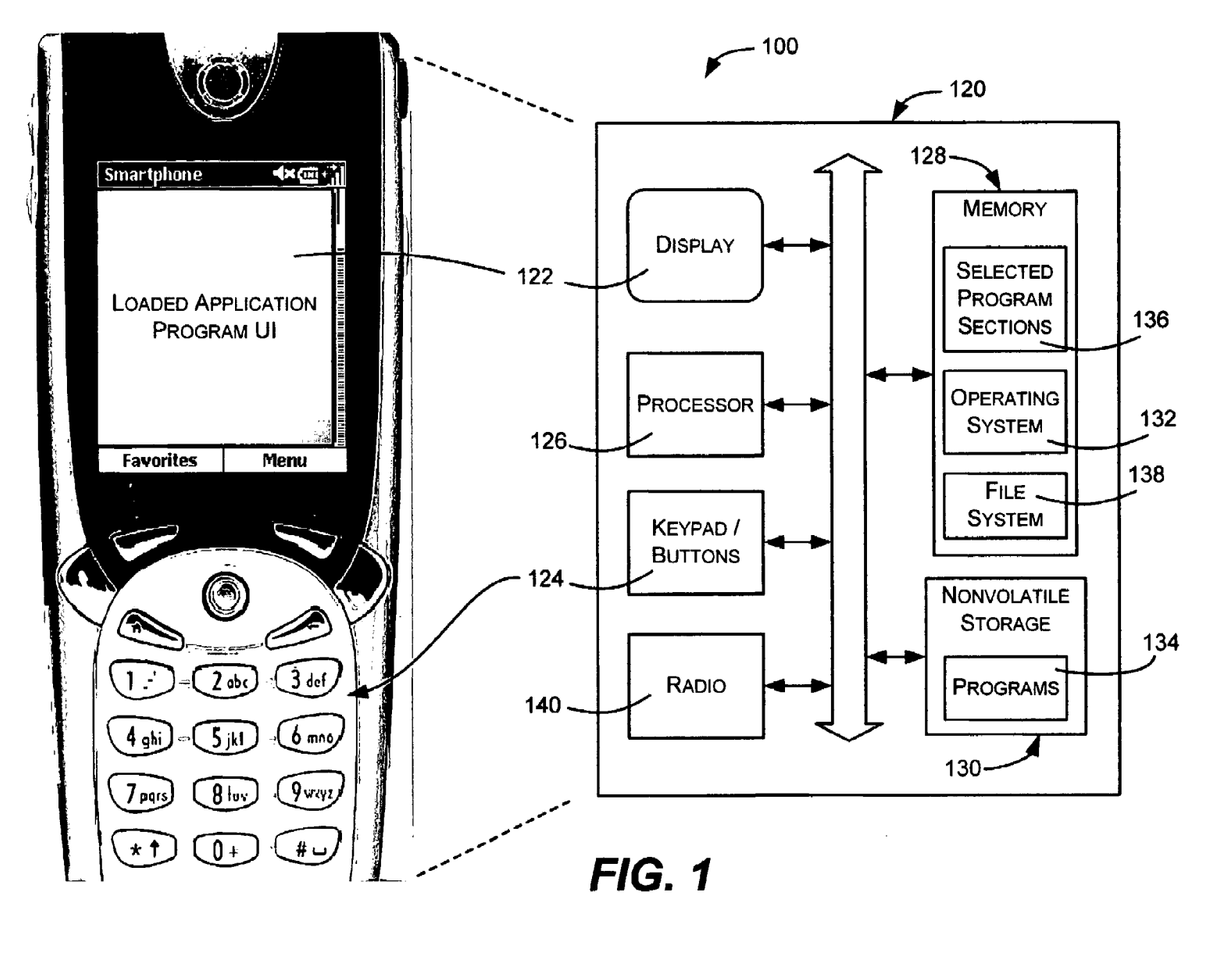
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment, e.g., incorporated into a mobile telephone (Smartphone), and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, there is shown an exemplary mobile telephone and computing device 120. As described below, the device 120 includes a user interface comprising a display 122 and keypad/buttons 124 for presenting and interfacing with running application programs and the like. The user interface may also include a touch-sensitive screen. For mobile telephone devices, a speaker and microphone are also present.

Other functional components of such a computing device 120 include a processor 126, a memory (RAM) 128, and nonvolatile storage 130 (e.g., ROM, flash, memory cards, and so forth). When powered, an operating system 132 is resident in the memory 128 and executes on the processor 126, such as a Windows®—based operating system from Microsoft Corporation.

Figure 2:
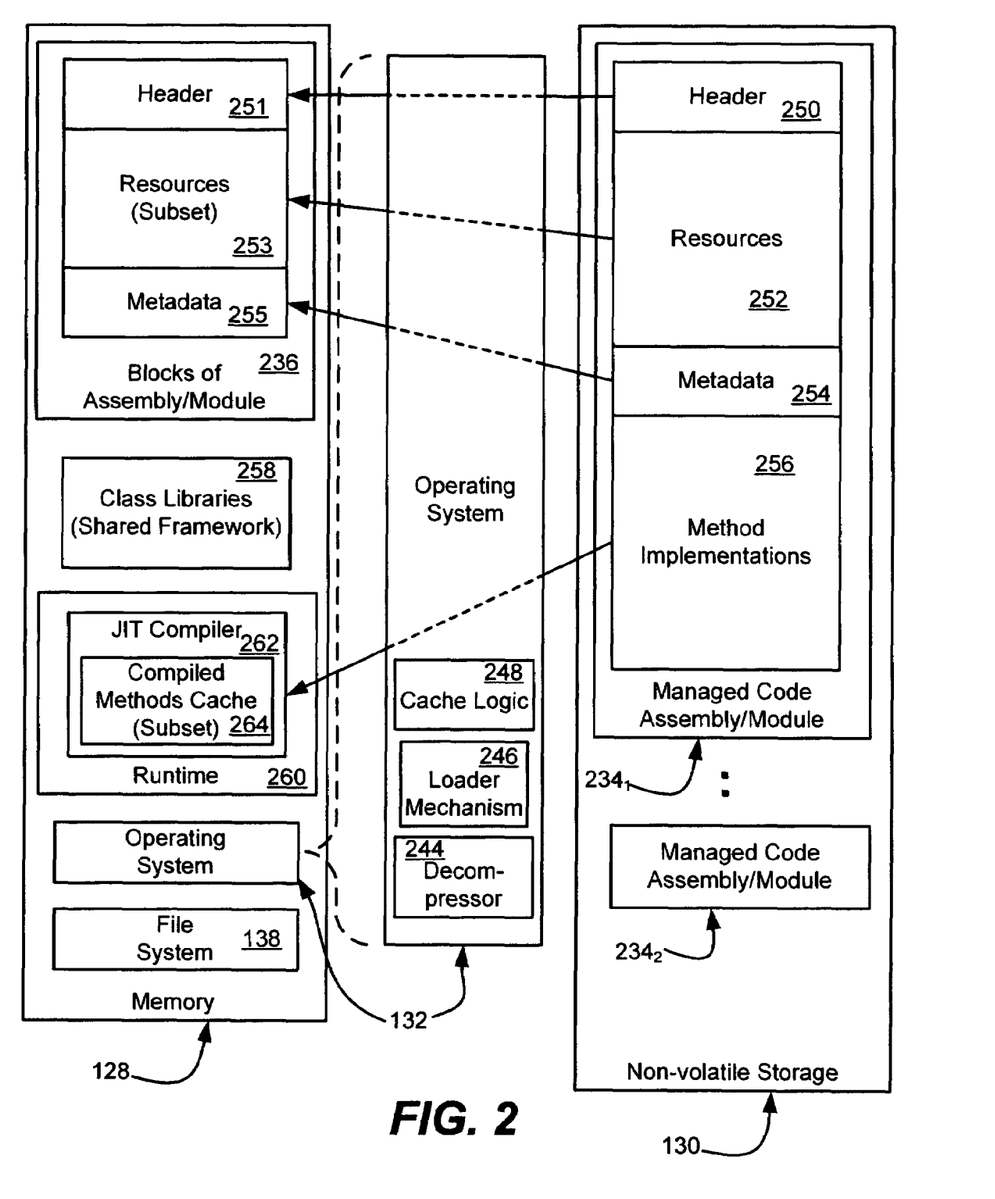
FIG. 2 is a block diagram generally representing example components for selectively loading sections of a managed code program into memory for efficient execution, in accordance with various aspects of the present invention.

One or more application programs 134 are maintained in the nonvolatile storage, e.g., in a compressed form, and may be loaded (including decompressed) into the memory 128 via a file system 138 and run on the operating system 132. Also shown for completeness in FIG. 2 is a set of class libraries 258 containing functions (e.g., file access APIs) that any application programs can use, and a runtime 260 including or otherwise associated with a just in time (JIT) compiler 262, which may include or be associated with a cache 264 containing some subset of previously compiled methods.

As described below, in accordance with various aspects of the present invention, selected program sections 136 are loaded into the memory 128 in different ways. Examples of such applications include email programs, scheduling programs, PIM (personal information management) programs, word processing programs, spreadsheet programs, Internet browser programs, and so forth. The handheld personal computer 120 includes communication-related hardware and software including a radio 140 (and antenna) suitable for connecting the handheld personal computer 120 to a network, which for mobile telephone devices includes making a telephone call.

Caching Managed Code for Efficient Execution

The present invention is generally directed towards a system and method by which various sections (parts) of a managed code assembly are handled differently with respect to caching in memory. A result is that resource-constrained devices, including those without the ability to use virtual memory/memory mapping techniques, are able to efficiently execute managed code. It is understood, however, that the present invention may be implemented in devices having other platforms, including those capable of virtual memory addressing and memory mapping techniques.

As will be also understood, numerous ways to implement the present invention are feasible, and only some of the alternatives are described herein. For example, the present invention is primarily described below with reference to caching different sections of managed programs (e.g., methods, metadata and resources) differently based on established rules for anticipated usage. However, it should be understood that such established rules are not required, or can be superseded; e.g., a program developer may specify how certain sections of an assembly should be cached, including specific resources. As such, the present invention is not limited to any particular examples used herein, but rather may be used various ways that provide benefits and advantages in computing in general.

In one example implementation, the present invention reduces the overall amount of memory (i.e., RAM) required by execution engines to execute a managed code program (an application program or a dynamic link library, i.e., DLL), which is particularly valuable on small, resource-constrained platforms. In general, this is accomplished by using a loader mechanism that only maintains specific sections of the running assembly/module (the managed code program) in memory, while still maintaining almost peak performance. To this end, one solution provides an efficient method of loading managed code assemblies, by intelligently loading selected sections of the assembly into memory and maintaining them in the memory while the managed code program is running, including information (e.g., offsets) to non-loaded program parts of the managed code program. These other parts of the managed code program are loaded only on demand; and when space is needed may be removed by other (e.g., more conventional) caching mechanisms or garbage collection mechanisms. This essentially allows the runtime to execute somewhat similar to a platform that allows memory mapped files, that is, by allowing the runtime to execute normally without accessing the file system. At the same time, much of the file content of the assembly is kept out of memory, lowering the amount of memory required for a given program. As will be understood, a beneficial result of the present invention is that not only may larger application programs be run on resource-constrained devices having platforms that are incapable of memory mapping, but an entire runtime environment may be loaded on such a device, to allow the managed code to run.

In accordance with an aspect of the present invention, the general behavior of a runtime/execution engine and the layout of managed code files are used to substantially optimize the memory usage in systems that do not have memory mapped file support. To this end, the present invention separates each managed code file (the managed code assembly) into sections based on their functionality, content and usage, and loads the sections for the entire time that the program is running, or on demand (which may be only temporarily, that is, while needed). The developer (or even the user) may tune the memory usage for each appropriate section, e.g., based on the runtime architecture and running application program.

As represented in FIG. 2, a managed code assembly $234_1$ in the nonvolatile storage 130 is accessed via the file system 138 and (typically) decompressed by a decompressor component 244. In accordance with various aspects of the present invention, in one implementation the operating system 132 includes a loader mechanism 246 that parses the managed code assembly $234_1$ to separate it into four general sections, wherein as used herein, a "section" represents any contiguous or discontinuous code, data, and/or metadata, alone or in any combination, that is distinguishable and separable. In general, the loader 246 may be selective as to what sections (described below) get loaded into memory, or may load the entire managed code assembly/module file $234_1$ into memory but then only keep desired sections of that file in memory. In a described implementation, data corresponding to the various sections of the managed code assembly/module $234_1$ are shown in the nonvolatile storage 130, and comprise a header 250, a resources part 252, a metadata part 254 and method implementations part 256. In general, each of these is treated differently in order to reduce memory consumption, with very good performance.

FIG. 2 shows selected blocks of the assembly/module 236, including the header and metadata, labeled 251 and 255, respectively, when loaded into the memory 128. Note that as described below. Only a subset 253 of the resources may be loaded as a block into memory such that the resource subset 253 is maintained as a section in memory while the program is running, while other resource section(s) are only loaded on demand.

In general, the Header 251 contains information that is used to identify the assembly stored in the runtime, and to load the rest of the file. It is generally loaded into the memory 128, and used in a known manner by having its important pieces loaded into machine state. In keeping with the present invention, however, the header file block is then unloaded immediately after use, as indicated by the shading on block 251 in FIG. 2.

The Resources part 252 may include sections that are treated differently with respect to caching, such as by type of resource. Different types of resources tend to have dynamic usage patterns, and may include text strings and bitmaps or graphic images, such as used in dialogs, windows control, layouts, pictures and so forth. Large images tend to be loaded only once, e.g., into an object. In general, the type of resource as well as its size and other criteria may be used to determine whether the resource should be maintained in memory while the program is running, or whether the resource should be loaded on demand.

For example, one type of resource comprises the program's strings. With respect to strings, because the usage of resource strings is unpredictable and varies from program to program based on the developer, strings are typically loaded into the memory 128 and maintained in the resource subset 253 and not unloaded (even temporarily) while the program is running. Strings are typically small and consume only a relatively small amount of memory, unless there are a relatively large number of strings. For applications with a large number of strings, a simple cache mechanism can be set up, such as one based on frequency of usage or most recent usage. The operating system may include or be associated with cache logic 248 for maintaining such a cache.

Another type of resource may be a managed program's images. For applications that use many images, the images can take anywhere from five to ninety percent of the assembly size, depending on the image size. The usage pattern of images is ordinarily different from other resources and parts of the assembly. For example, many images are typically loaded into a program object (an image or bitmap object) once, and then referenced and drawn using the program object. Because of this behavior, one implementation of the present invention loads images from resources 252 in the nonvolatile storage 130 when needed (on demand), and after use immediately discards the image data, (or discards them when space is needed or as otherwise appropriate, e.g., via conventional caching mechanisms and/or garbage collection mechanisms).

In contrast to such rarely-drawn, often large images, other types of image resources may comprise user interface-related control resources, such as small icons, dialog, and window and control layout information or the like, which are regularly needed. These types of images may be maintained in the resource subset 253 in the memory 128, yet because of their size does not consume large amounts of memory space. The usage pattern for dialog, window and control layout information is also different, as these images are needed when the control is created. Although this is often only once, there are many controls that get created during startup, which drastically increases startup time if continually fetched via the file system. To avoid such delays, although most of the information is only used during initial startup, the overall size is small enough so it does not largely impact memory usage and thus control resources are loaded and kept in memory.

As can be readily appreciated, there are thus various caching options available for resources, including optionally keep no resources in memory and load only on demand/discard once used, or optionally keep some resource in memory based on resource type, e.g., strings (with possibly some conventional caching) and load other resources on demand. Another option is to use the size of the resource as the criterion, and keep small-sized resources below a threshold (whether loaded on demand or in advance) in memory and discard (e.g., garbage collect) resources above the threshold size after use. A combination of type and size is another option, as generally described herein. Also, developer (or even user)-identified resources may be kept in memory, by setting resource attributes or the like to keep the resource alive (in memory)

regardless, keep the resource alive if some sufficient amount of memory is available, keep alive for some number of uses, and so forth.

In sum, the decision on whether to maintain a given resource in the subset 253 that is maintained while the application program is running, or whether to discard or conventionally cache the resource after use, is initially made by the loader 246. To this end, the loader 246 may employ essentially any criteria, including type of resource (as described above) and size of resource, or specific developer/user requests. For example, a developer may indicate that even though a resource is large, it should be maintained in memory because it will be used frequently. For resources that are not maintained in the subset 253, another type of caching mechanism, represented in FIG. 2 by the cache logic 248, may be used for still further efficiency.

The metadata section 255 contains information about the classes, members and methods in a program, and is frequently used in running managed code, e.g., for type checking and identifying objects' functions. For example, the metadata includes information about the names of the methods (functions) and variables, the types of variables the method takes (for type checking), and so on. For efficiency, the metadata section 255 (or another data block) may also keep a pointer to the start of the program $234_1$ in the storage 130, along with an offset pointer to the method implementations part 256 and an offset pointer to resources part 252; this avoids having to go through the file system each time such information is needed. The metadata 255 may also maintain the offsets to the functions in the method implementations part 256 and the offsets to the resources in the resource part 252.

In keeping with various aspects of the present invention, because the metadata is frequently accessed, the metadata section 254 is thus loaded as the block 255 and (ordinarily) kept in the memory 128 the entire time that the program is running. Note that prior to the present invention, the swapping of metadata out of RAM by a conventional caching mechanism is one of the main reasons for the performance problems that occur.

In keeping with various aspects of the present invention, method implementations 256 (essentially comprising byte codes or MSIL, Microsoft® Intermediate Language, instructions in the storage 130 compiled/translated into class/method machine-level instructions/descriptions in the memory 128) are only loaded when needed, and then immediately discarded. In general, the loading time is insignificant relative to the Just In Time compiling time; in one implementation, in order to speed up loading from storage when needed, file indexes can be kept with each of the method descriptors in the metadata. This prevents having to seek through the file to find a method. Further, once a method is compiled, the compiled copy may be kept in a conventional code cache, as described below.

In general, the usage pattern of method implementations by the runtime 260 is very specific. Method implementations often take up half the assembly $234_1$ or more (e.g., for applications without significant images), and are only accessed by a verifier component and just in time compiler component 262 of the runtime 260. Because of this usage pattern, in one implementation the method implementations are only loaded into memory on demand when required for compiling, and thereafter are immediately unloaded. Since compiling the methods with the just in time compiler has a reasonable overhead, the addition of loading the method's byte codes from disk does not adversely affect performance. In fact, most methods are only compiled once, and the first time has no performance difference from memory mapped files, since they both need to load from disk/storage the first time.

The following managed program provides a simple example of a managed assembly that has separate sections for the loader mechanism 246 to distinguish with respect to loading different sections differently:

```
public class SampleClass
    {
        public int m__real;
        int m__imaginary;
        double m__radius;
        double m__angle;
        public SampleClass( )
        {
        }
        public String ToString( )
        {
            return m__imaginary.ToString( ) + m__real.ToString( );
        }
        public String ToString(FormatStyle fs)
        {
            if (fs == FormatStyle.RadialStyle)
            {
                return m__radius.ToString( ) + m__angle.ToString( );
            }
            else if (fs == FormatStyle.CartesianStyle)
            {
                return m__imaginary.ToString( ) + m__real.ToString( );
            }
            return null;
        }
    }
```

The metadata for such a simple program/class contains information indicating that there is a class called SampleClass, which contains four internal variables. These variables are:

1) A variable called "m_angle" of type float64 that is private;
2) a variable called "m_imaginary" of type int32 that is private;
3) a variable called "m_radius" of type float64 that is private; and
4) a variable called "m_real" of type int32 that is public.

This class also contains three methods:
1) The constructor that takes on parameters and returns no parameters;
2) a function called "ToString" that takes a parameter of type class SampleClass.FormatStyle and returns a string; and
3) a function called "ToString" that takes no parameters and returns a string.

Note that the text above describes the data that is included in the metadata; in actuality, the metadata may not include specific code, and is generally compiled into a binary format.

As described above, for additional efficiency, the just in time compiler 262 may have an associated just in time (JIT) cache 264 of compiled methods that are maintained in the memory 128 for some time, e.g., until space is needed, such as via a most recently used or most frequently used algorithm. In platforms that are not virtual-memory-based, the present invention thus allows space consumed by rarely-used methods to be reclaimed, yet provides for the use of some caching, which is particularly efficient for methods that are reused.

Figure 3:
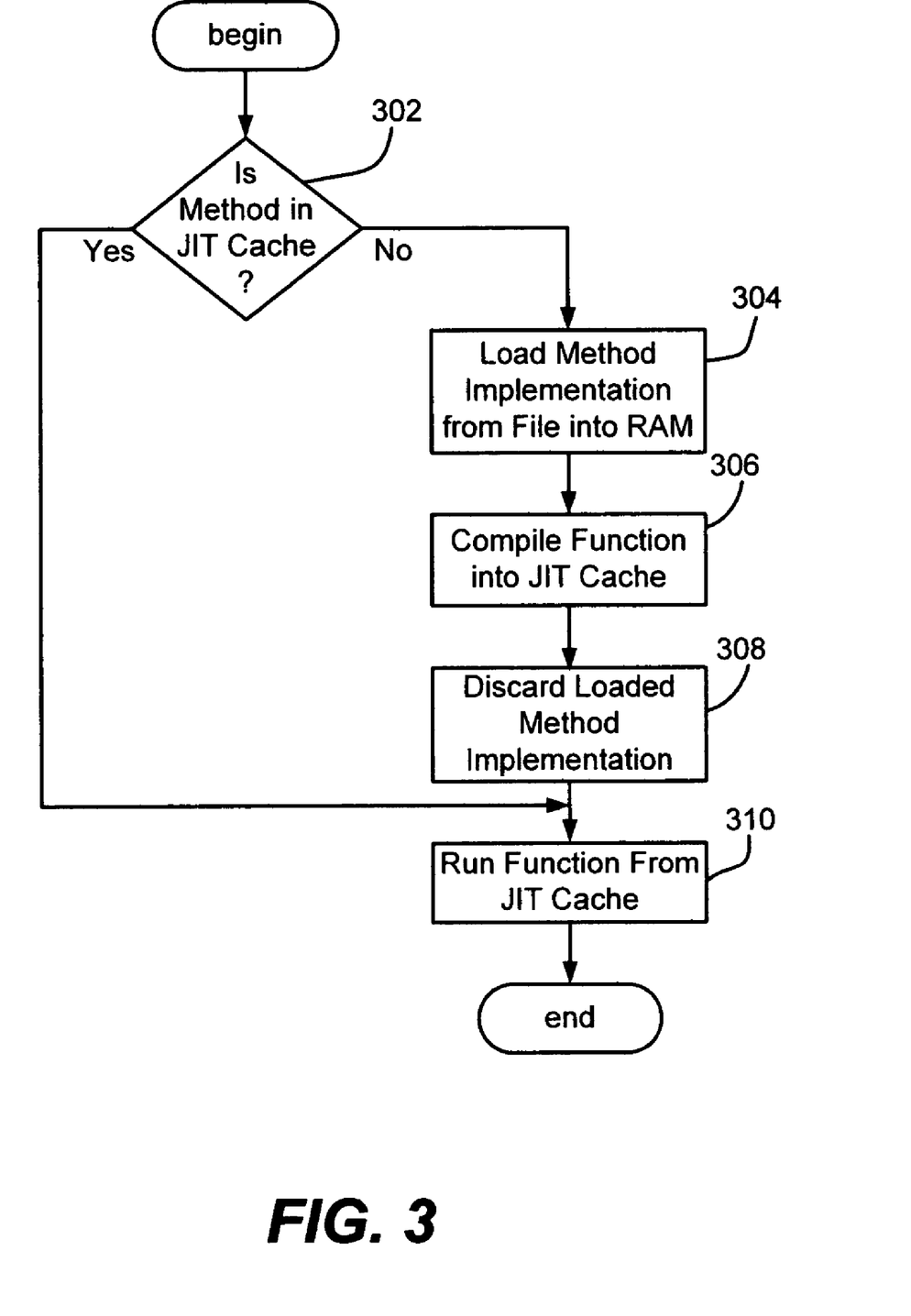
FIG. 3 is a flow diagram generally representing logic for determining whether a method implementation is compiled in a cache or needs to be loaded and compiled on demand, in accordance with various aspects of the present invention.

FIG. 3 shows general logic for handling a needed program method, beginning at step 302 where the JIT cache 264 is evaluated to determine whether the method is already compiled therein. Note that the metadata 255 (or other data block) may keep a pointer to compiled functions in the JIT cache 264; if NULL, the function is not compiled in the JIT cache 264. If already compiled in the JIT cache 264, step 302 branches ahead to step 310 to run the function from the JIT cache 264. Note that there are a number of checks that occur with running a method, and thus the logic of checking whether a method is already compiled adds only a relatively small amount of overhead.

Otherwise, if not previously compiled and cached, step 304 is executed to load the method implementation from the file into the memory. Step 306 represents the compiling of the method/function into the JIT cache 264; note that this may cause another compiled method to be removed from the cache if cache space is needed, (which would also NULL the metadata pointer for the removed method). Once compiled into the JIT cache 264, step 308 discards the loaded method implementation from the memory area where it was compiled. Step 310 runs the function from the JIT cache 264.

In accordance with another aspect of the present invention, the selected sections of the assembly that are loaded into memory can be saved as a code library file, containing the data corresponding to the selected sections. For example, once the header, desired subset of resources and metadata are loaded and kept in memory, the blocks of memory may be serialized out into the native library file (e.g., DLL) for the platform. This file may then be copied directly to memory and run, with the regular managed code program file (containing at least the method implementations and other resources but possibly the entire file) accessed on demand as described above. Note that this technique can also be used with non-shared managed code programs.

Figure 4:
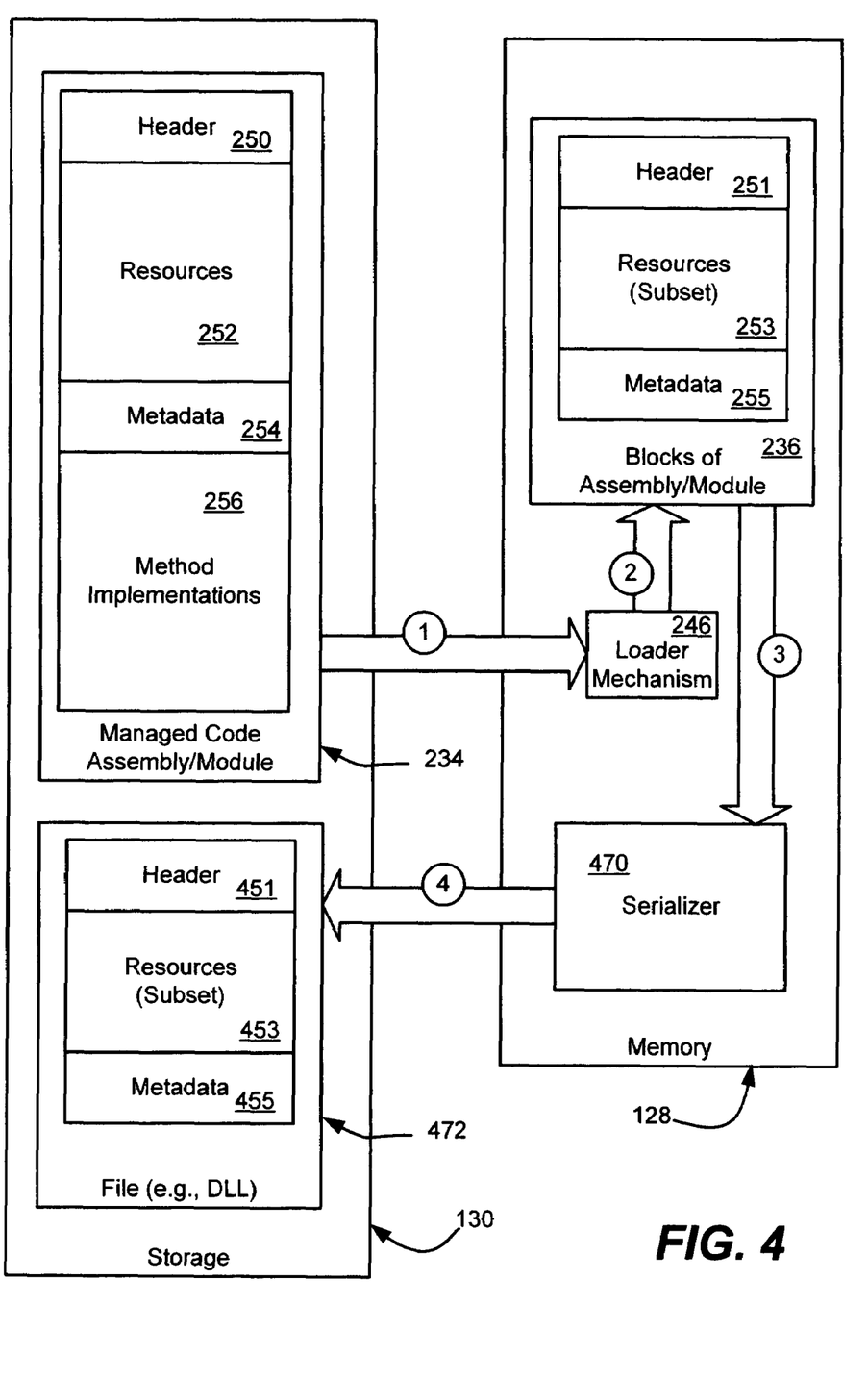
FIG. 4 is a block diagram generally representing example components for serializing selected sections of a managed code program in memory to nonvolatile storage for use as a library, in accordance with various aspects of the present invention.

FIG. 4 shows an example, including the loading via the loader mechanism 246 into the memory 128 of the various sections (the header 250, the resources part 252, the metadata part 254 and the method implementations part 256) of a managed code assembly/module 234 in the nonvolatile storage 130. The loading with selective retention is represented in FIG. 4 via the arrows labeled with circled numerals one (1) and two (2). As described above, only selected sections are maintained in memory, e.g., the header 251, resources subset 253 and metadata 255.

As also represented in FIG. 4, as represented via the arrows labeled with circled numerals three (3) and four (4), a serializer 470 or the like may be used to write the selected blocks of data 236 from the memory to corresponding data in a file 472 in the nonvolatile storage 130. This file contains the memory representation of what would be maintained in memory following the above-described selective loading/maintaining operation. Thus, when later needed, the entire file of selected data may be loaded as a whole, and execution immediately begun; no selective loading/retention is required. Note that original managed code file 234 may be reduced in size by removing this data, since it is available via the newly serialized file, with offsets adjusted as appropriate in the header data.

As a result of writing the selected sections to a file, the RAM requirements for a library may be shared across processes, that is, two or more processes may request loading of the same library and be pointed to the same location in memory. Additional processes that request loading of the same managed code assembly have almost no incremental RAM usage, saving memory consumption. This can also significantly reduce startup time, because the file has been previously parsed into the selected sections before serializing, and thus no subsequent parsing by the loader is needed, e.g., the operating system can directly copy the file to memory.

As can be seen from the foregoing detailed description, there is provided a method and system that efficiently runs managed code, including on platforms that do not support virtual memory and/or memory mapping. The amount of memory consumed is low, as is the accessing of the nonvolatile storage.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing device, a method for reducing the memory needed to efficiently execute managed code by handling differently various sections of a managed code program with respect to caching, the method comprising:

separating a managed code program into various sections wherein the separation is based on various attributes of the sections, the sections comprising a header, a resources section, a metadata section, and a method implementations section, wherein the metadata section comprises names of the methods of the managed code program, and the resources section comprises strings and images of the managed code program;

loading from a storage the metadata section and a subset of the resources section into memory without loading the method implementations section or the resources not included in the subset, wherein a resource is included in the subset based on factors including one or more of the size, the type, or the frequency of use of the resource;

maintaining the metadata section and the subset of the resources section in the memory such that the metadata section and the subset of the resources section are not removed in ordinary operation while running the managed code program; and loading at least a portion of the method implementations section and the resources not included in the subset into memory on demand.

2. The method of claim 1 wherein the metadata section further comprises variable names and type information.

3. The method of claim 1 wherein the subset of the resources section comprises user interface-related data.

4. The method of claim 3 wherein loading at least some code and/or data of the managed code program into memory on demand comprises loading data from the resources section that is not part of the subset.

5. The method of claim 4 wherein loading at least some code and/or data of the managed code program into memory on demand comprises loading image data.

6. The method of claim 3 wherein loading at least some code and/or data of the managed code program into memory on demand comprises loading the method implementations section on demand.

7. The method of claim 6 further comprising, maintaining a separate cache in memory for compiled method code.

8. At least one computer-readable storage medium having stored computer-executable instructions, which when executed perform the method of claim 1.

9. In a computing device, a system for reducing the memory needed to efficiently execute managed code by handling differently various sections of a managed code program with respect to caching, the system comprising:

a storage that contains managed code programs;

a memory; and a loader mechanism coupled to the storage to load a managed code program into the memory, the loader mechanism performing a method comprising:

separating a managed code program into various sections wherein the separation is based on various attributes of the sections, the sections comprising a header, a resources section, a metadata section, and a method implementations section, wherein the metadata section comprises names of the methods of the managed code program and the resources section comprises strings and images of the managed code program;

loading from a storage the metadata section and a subset of the resources section into memory without loading the method implementations section or the resources not included in the subset, wherein a resource is included in the subset based on factors including one or more of the size, the type, or the frequency of use of the resource;

maintaining the metadata section and the subset of the resources section in the memory such that the metadata section and the subset of the resources section are not removed in ordinary operation while running the managed code program; and loading at least a portion of the method implementations section and the resources not included in the subset into memory on demand.

10. The system of claim 9 wherein the metadata section further comprises variable names and type information.

11. The system of claim 9 wherein the subset of the resources section comprises user interface elements.

12. The system of claim 9 wherein loading at least some code and/or data of the managed code program into memory on demand comprises loading at least one item of a set, the set containing method code and data from the resources section that is not part of the subset.

13. The system of claim 9 wherein the memory contains a compiled method cache, and wherein a needed method that is not in the compiled method cache is loaded on demand and compiled.

14. At least one computer-readable storage medium having stored computer-executable instructions, which when executed perform steps, comprising:

receiving a request to execute a managed code program;

separating the managed code program into various sections wherein the separation is based on various attributes of the sections, the sections comprising a header, a resources section, a metadata section, and a method implementations section, wherein the metadata section comprises names of the methods of the managed code program and the resources section comprises strings and images of the managed code program;

loading the header, the metadata section, and a subset of the resources section from a storage into memory without loading the method implementations section or the resources not included in the subset, wherein a resource is included in the subset based on factors including one or more of the size, the type, or the frequency of use of the resource;

removing the header from the memory while maintaining the metadata section and the subset of the resources section in memory for the duration of the ordinary execution of the managed code program; and loading at least a portion of the method implementation section and the resources not included in the subset into memory on demand.

15. The computer-readable storage medium of claim 14 wherein loading at least one other section of the managed code program on demand comprises loading data from the resources section that is not part of the subset into the memory on demand.

16. The computer-readable storage medium of claim 14 wherein loading at least one other section of the managed code program on demand comprises determining that a compiled method corresponding to the method implementation is not compiled in a cache of previously-compiled methods.

17. The computer-readable storage medium of claim 14 having further stored computer-executable instructions comprising, saving to a file in storage, data in the memory that corresponds to the metadata section and the subset of the resources section.

18. The method of claim 1, wherein the metadata section further comprises a pointer to the start of the managed code program, an offset pointer to the method implementations section, and an offset pointer to the resources section.

19. The computer-readable storage medium of claim 17 wherein the file comprises a native library file.

20. The computer-readable storage medium of claim 19 wherein the native library file comprises a dynamic link library.

* * * * *